(12) United States Patent
Doshi et al.

(10) Patent No.: US 11,409,613 B1
(45) Date of Patent: Aug. 9, 2022

(54) SYSTEM AND METHOD FOR RAW DISK BACKUP AND RECOVERY

(71) Applicant: EMC IP Holding Company LLC, Hopkinton, MA (US)

(72) Inventors: Girish Balvantrai Doshi, Pune (IN); Pramod Dnyanoba Biradar, Pune (IN); Rohan Sudhakar Pednekar, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/226,184

(22) Filed: Apr. 9, 2021

(51) Int. Cl.
*G06F 12/00* (2006.01)
*G06F 11/14* (2006.01)
*G06F 3/06* (2006.01)
*G06F 11/30* (2006.01)

(52) U.S. Cl.
CPC .......... *G06F 11/1461* (2013.01); *G06F 3/064* (2013.01); *G06F 3/067* (2013.01); *G06F 3/0619* (2013.01); *G06F 11/1451* (2013.01); *G06F 11/1464* (2013.01); *G06F 11/1469* (2013.01); *G06F 11/3075* (2013.01)

(58) Field of Classification Search
CPC .... G06F 11/1461; G06F 3/0619; G06F 3/064; G06F 3/067; G06F 11/1451; G06F 11/1464; G06F 11/1469; G06F 11/3075
See application file for complete search history.

(56) References Cited

U.S. PATENT DOCUMENTS

| | | | | |
|---|---|---|---|---|
| 6,128,540 | A * | 10/2000 | Van Der Vegt | G06Q 30/0201 705/7.29 |
| 10,216,449 | B1 * | 2/2019 | Li | G06F 11/1451 |
| 2012/0233172 | A1 * | 9/2012 | Skillcorn | G06F 11/1448 707/E17.089 |
| 2017/0075698 | A1 * | 3/2017 | Zamir | G06F 3/0689 |
| 2018/0039434 | A1 * | 2/2018 | Balcha | G06F 3/0665 |
| 2020/0341852 | A1 * | 10/2020 | Chopra | G06F 11/1451 |
| 2021/0374645 | A1 * | 12/2021 | Gutman | G16H 70/20 |

* cited by examiner

*Primary Examiner* — John A Lane
(74) *Attorney, Agent, or Firm* — Chamberlain, Hrdlicka, White, Williams & Aughtry

(57) ABSTRACT

A backup manager for providing backup services to clients includes storage for storing a priority list. The backup manager also includes a processor programmed to obtain a request to generate a backup for a client of the clients; make a determination that the client is a high restoration priority client using the priority list; in response to the determination: obtain a raw disk backup for the client; and store the raw disk backup in backup storage in raw disk format.

20 Claims, 10 Drawing Sheets

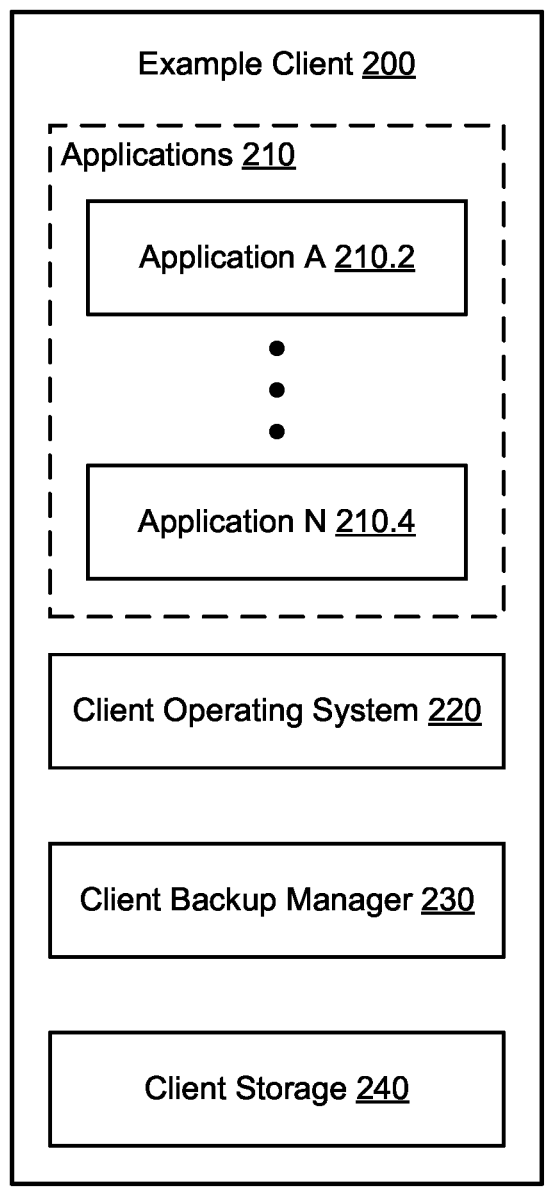
FIG. 2.1

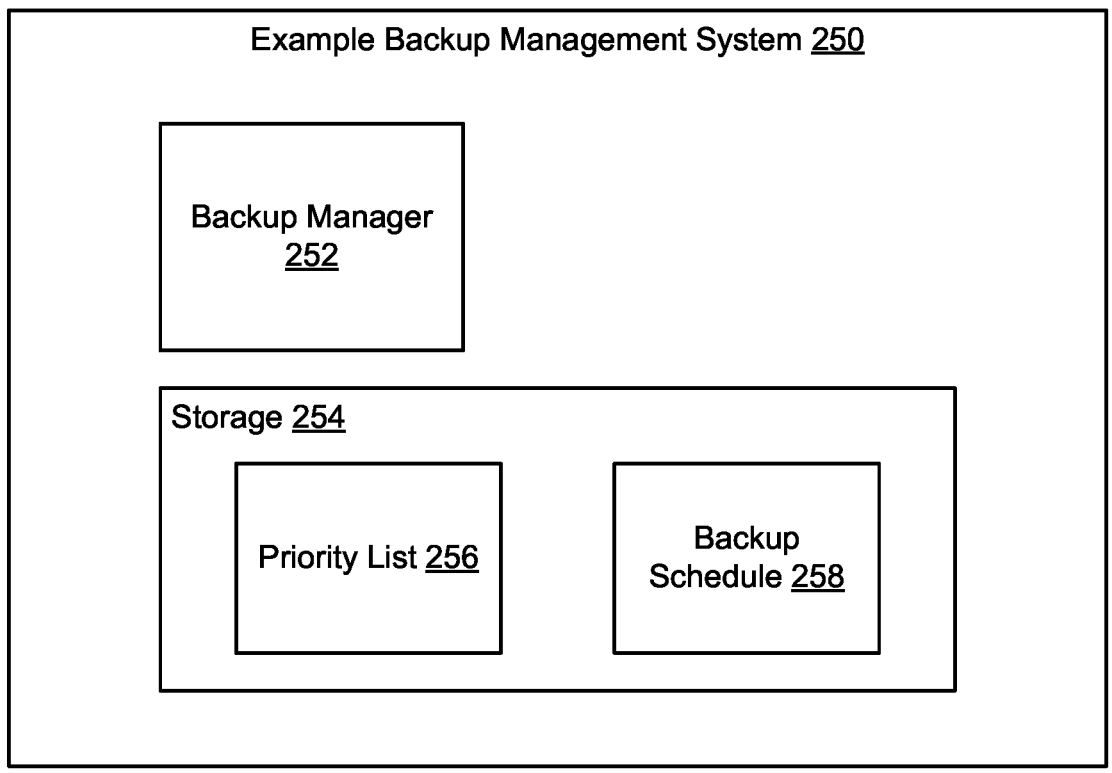
FIG. 2.2

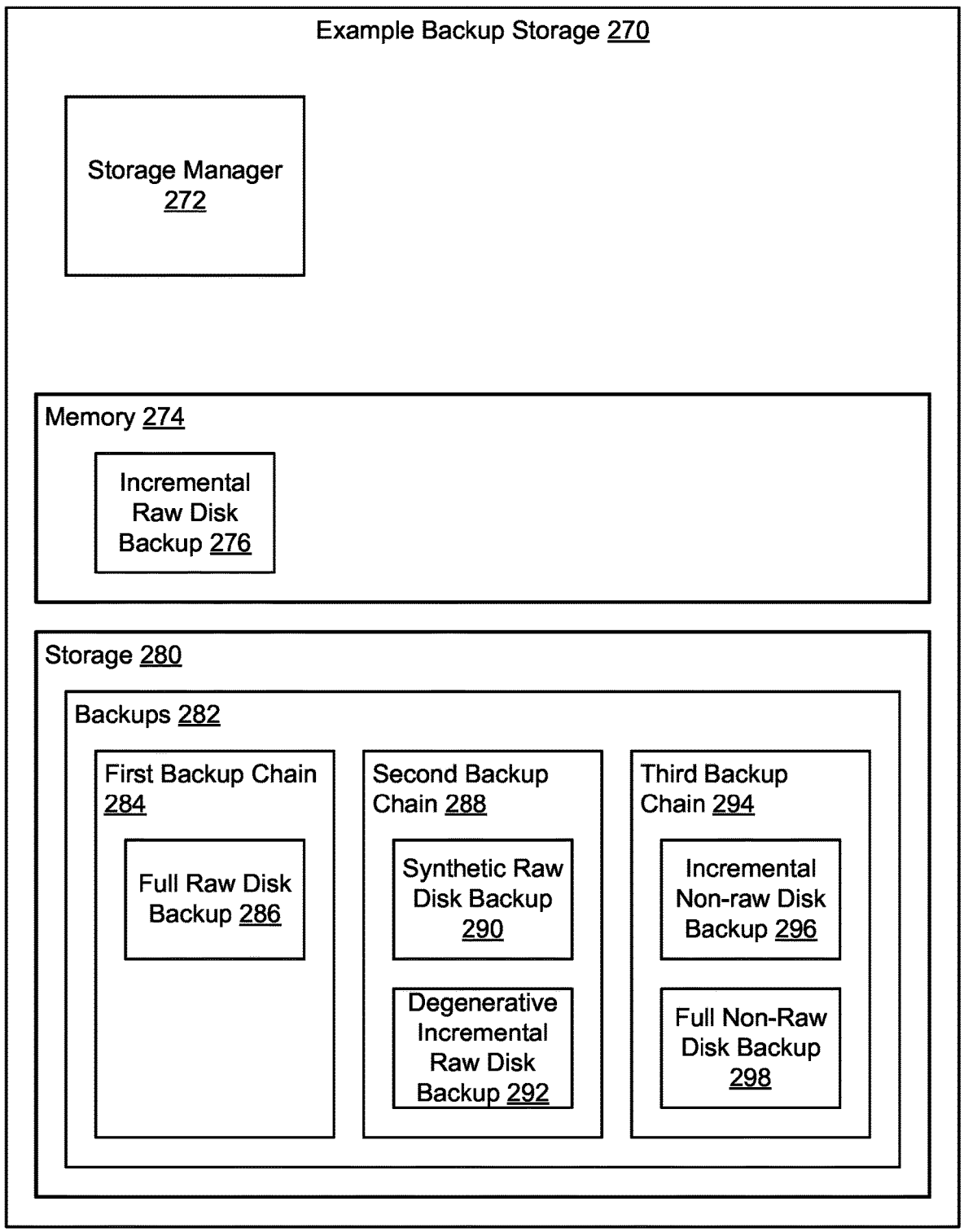
FIG. 2.3

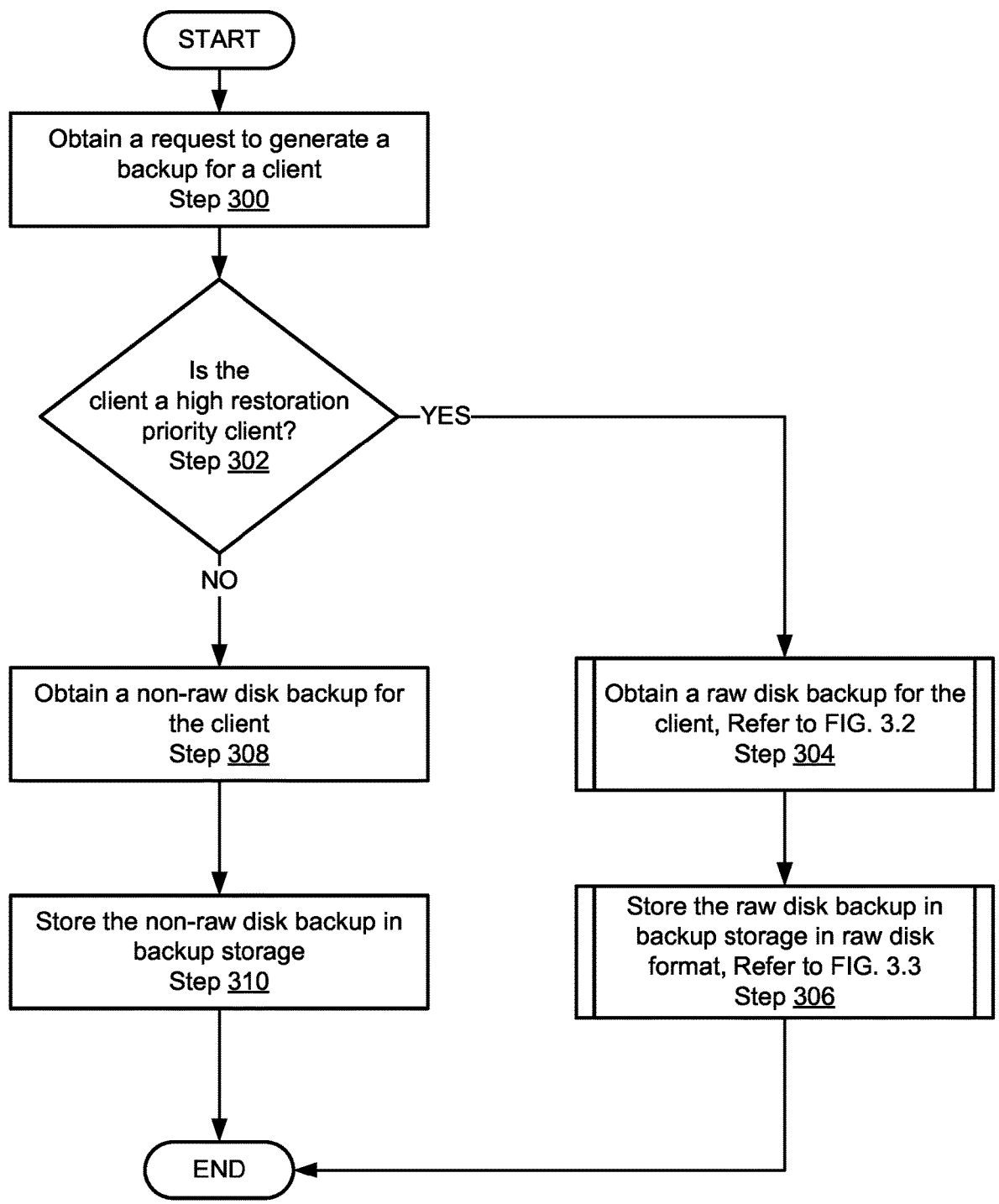
FIG. 3.1

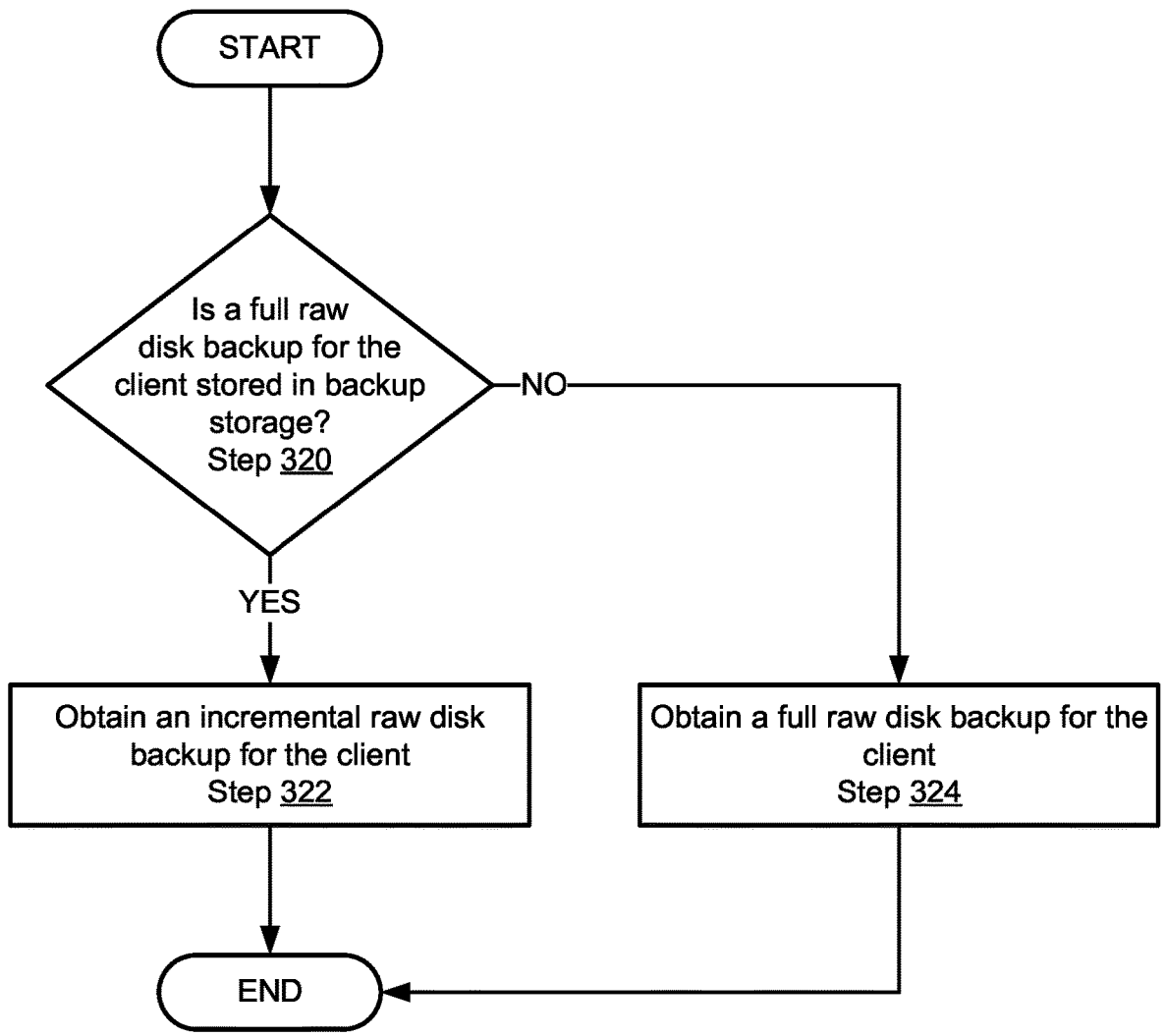
FIG. 3.2

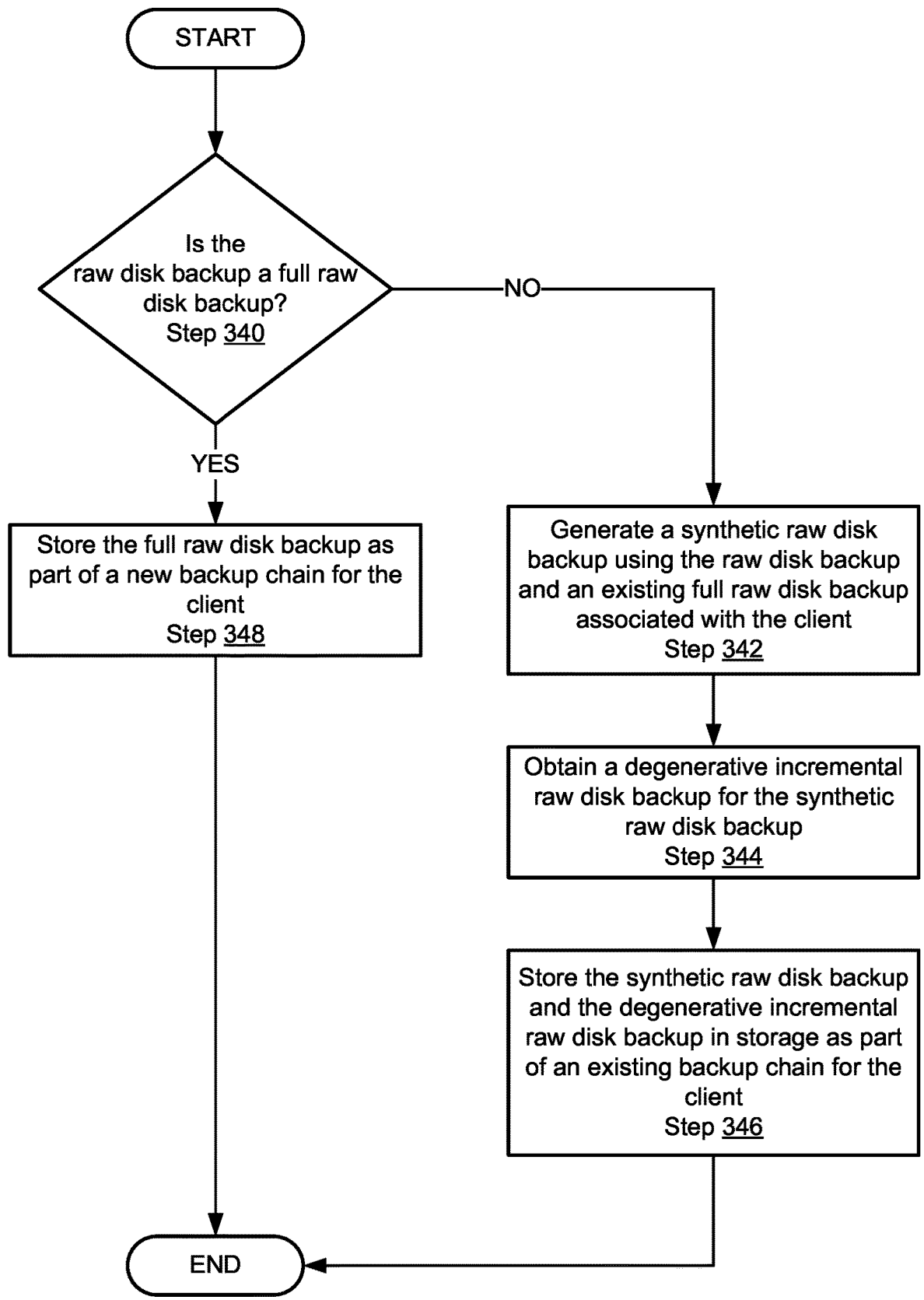
FIG. 3.3

SYSTEM AND METHOD FOR RAW DISK BACKUP AND RECOVERY

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

When data is lost due to device failure, software failure, etc., the data may be unrecoverable if no copies of the data were made and stored in locations other than the persistent storage.

SUMMARY

In one aspect, a backup manager for providing backup services to clients in accordance with one or more embodiments of the invention includes storage for storing a priority list. The backup manager also includes a processor that obtains a request to generate a backup for a client of the clients; that makes a determination that the client is a high restoration priority client using the priority list; in response to the determination: that obtains a raw disk backup for the client; and that stores the raw disk backup in backup storage in raw disk format.

In one aspect, a method of providing backup services to clients in accordance with one or more embodiments of the invention includes obtaining a request to generate a backup for a client of the clients; making a determination that the client is a high restoration priority client using a priority list; in response to the determination: obtaining a raw disk backup for the client; and storing the raw disk backup in backup storage in raw disk format.

In one aspect, a non-transitory computer readable medium in accordance with one or more embodiments of the invention includes computer readable program code, which when executed by a computer processor enables the computer processor to perform a method of providing backup services to clients. The method includes obtaining a request to generate a backup for a client of the clients; making a determination that the client is a high restoration priority client using a priority list; in response to the determination: obtaining a raw disk backup for the client; and storing the raw disk backup in backup storage in raw disk format.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example client in accordance with one or more embodiments of the invention.

FIG. 2.2 shows a diagram of an example backup management system in accordance with one or more embodiments of the invention.

FIG. 2.3 shows a diagram of an example backup storage in accordance with one or more embodiments of the invention.

FIG. 3.1 shows a flowchart of a method of providing backup services in accordance with one or more embodiments of the invention.

FIG. 3.2 shows a flowchart of a method of obtaining a raw disk backup in accordance with one or more embodiments of the invention.

FIG. 3.3 shows a flowchart of a method of storing a raw disk backup in accordance with one or more embodiments of the invention.

DETAILED DESCRIPTION

Figure 1:
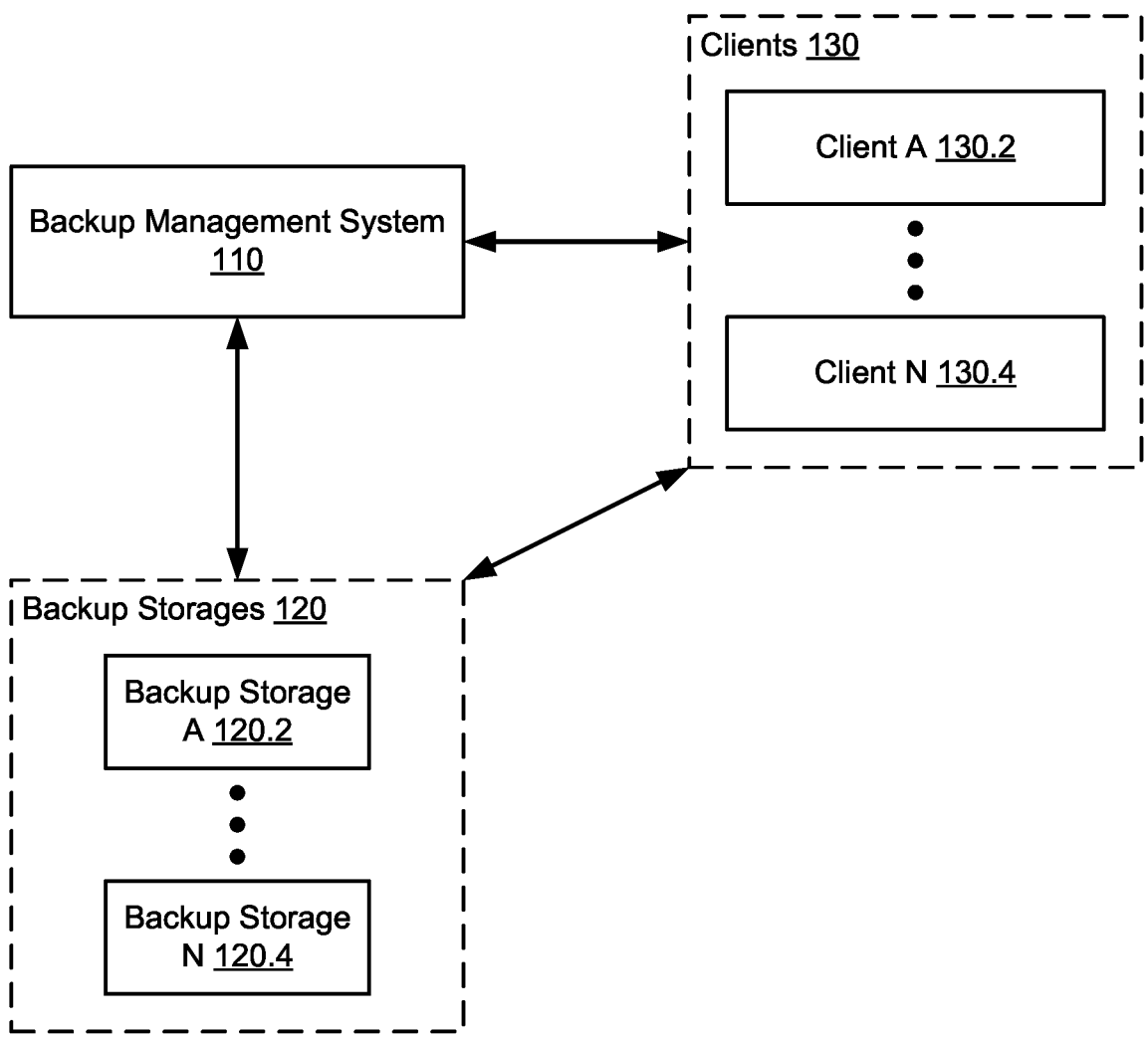
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services to a client. Providing data protection services may be computationally costly and/or time consuming depending on how the data protection services are provided. Consequently, data protection services may not meet expectations or may negatively impact the operation of a system.

To reduce the likelihood of negatively impacting the operation of a system, embodiments of the invention provide a system that provides different types of data protection services based on the expectations (e.g., set forth in a service level agreement, policy, etc.). To meet high expectations, the system may proactively take action (e.g., and consume more computing resources/time), in advance of a restoration (e.g., prior to receiving a restoration request), to reduce the computational cost and/or time for performing the restoration by selectively generating and using certain types of backups (e.g., raw disk backups). To meet low expectations, the system may limit its proactive action taken in advance of a restoration by generating backups that may require more computational resources and/or time to perform a restoration. By doing so, the system may marshal its limited computing resources to meet the expectations regarding its provided data protection services thereby improving the quality of the provided data protection services.

To provide data protection services, embodiments of the invention may provide a system that enables non-raw disk backups and raw disk backups of clients to be generated and stored on backup storage. A non-raw disk backup is a backup that is generated in a format that requires combining blocks of the non-raw disk backup into a single disk file, e.g., a virtual machine disk file or a virtual hard disk file, prior to being used to generate a client-accessible disk volume. A raw disk backup is a backup that is generated in raw disk format and, therefore, can be used to generate a client-accessible disk volume without first combining blocks of the raw disk backup into a single disk file.

In one or more embodiments of the invention, the raw disk backup is a full raw disk backup associated with a first state of the client. In other embodiments, the raw disk backup may be a synthetic raw disk backup generated using the full raw disk backup associated with the first state of the client and one or more incremental raw disk backups that specify changes made to data of the client that occurred after the full raw disk backup was generated, i.e., a later state of the client. Degenerative incremental raw disk backups may also be generated based on the full raw disk backup and incremental raw disk backups that are usable to revert a synthetic raw disk backup to a previous state. For example, a degenerative incremental raw disk backup may be usable to revert a synthetic raw disk backup associated with a second state of the client to a full raw disk backup associated with a first state of the client. Similarly, a degenerative incremental raw disk backup may be usable to revert a synthetic raw disk backup associated with a third state of the client to a synthetic raw disk backup associated with a second state of the client.

In one or more embodiments of the invention, the system, upon obtaining a restoration request, uses the raw disk backup to generate a disk volume. Once the disk volume is generated, the system may provide an instance of the client with access to the disk volume. When compared to a restoration of the client using a non-raw disk backup, which must be combined into a single disk file and/or transferred to a client in its entirety, providing the instance of the client access (e.g., remote access via a network) to the disk volume may reduce the time associated with accessing data on the stored backup once a restoration request is obtained. Additionally, as restoration requests are commonly directed to the latest state of a client, generating a synthetic raw disk backup at the latest state of the client may further reduce the time associated with accessing data on the stored backup since no additional steps need to be taken to bring the stored backup to the latest state.

FIG. 1 shows an example of a system in accordance with one or more embodiments of the invention. The system may include clients (130) that host applications such as virtual machines, database applications, electronic communication applications, file sharing applications, and/or other types of applications. Further, the clients (130) may host applications directly or the clients (130) may host any number of layers of virtualization or other forms of software/hardware based resource abstraction, which, in turn, host the applications utilized by the remote clients (130). To host applications, the clients (130) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The use of the applications hosted by the clients (130) may result in the generation of data. The data may be important to the clients (130) and/or a user of the clients (130) and may be required to be stored for protection and/or restoration purposes (e.g., in accordance with a data protection strategy or other policy). The data may be stored for other and/or additional purposes without departing from the invention. Storing the data in the hardware devices of the clients (130) may be problematic because hardware devices may fail. The failure of hardware devices may result in data loss and/or data corruption.

To improve the likelihood that data stored in hardware devices of the clients (130) is available for future use, backups of the clients (130) may be generated and stored in the backup storages (120). A backup of one of the clients (130) may include data that may be used to restore all, or a portion, of the clients (130), or all, or a portion, of an entity hosted by the client, to a previous point in time. Thus, if data hosted by one of the clients (130) is lost, access to the data may be restored by restoring all, or a portion, of the client using information stored in the backup storages (120).

The system may also include a backup management system (110) that provides, in part, data protection services to the clients (130). The data protection services may include managing generation of scheduled backups (e.g., a full backup or incremental backup of a client that is generated based on a schedule) for the clients (130), and/or managing restoration of the clients (130) using backups stored in the backup storages (120) and/or other locations.

To manage backup generation and storage of backups, the backup management system (110) may provide information to the clients (130) that enables the clients (130) to determine what type of backup, e.g., a non-raw disk backup or a raw disk backup, is to be generated by the clients and to independently generate and/or store scheduled backups in the backup storages (120). The information may include a priority list that indicates if a specific client is a high priority client or a lower priority client. The priority of the client (e.g., 130.2) may determine what type of backup, e.g., a non-raw disk backup or a raw disk backup, is to be generated by the client. The information may also include a backup schedule of when the clients (130) are to generate and/or store a full backup and/or an incremental backup, such as a log backup.

The components of the system illustrated in FIG. 1 may be operably connected to each other and/or operably connected to other entities (not shown) via any combination of wired and/or wireless networks. Each component of the system illustrated in FIG. 1 is discussed below.

In one or more embodiments of the invention, the clients (130) are implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-4. The clients (130) may be implemented using other types of computing devices without departing from the invention. For additional details regarding computing devices, refer to FIG. 6.

In one or more embodiments of the invention, the clients (130) are implemented using distributed computing devices. As used herein, a distributed computing device refers to functionality provided by a logical device that utilizes the computing resources of one or more separate and/or distinct physical computing devices. For example, in one or more embodiments of the invention, the clients (130) is implemented using distributed devices that include components distributed across any number of separate and/or distinct computing devices. In such a scenario, the functionality of the clients (130) may be performed by multiple, different computing devices without departing from the invention.

The clients (130) may be implemented using logical devices without departing from the invention. For example, the clients (130) may be implemented using virtual machines that utilize computing resources of any number of physical computing devices to provide the functionality of the clients (130). The clients (130) may be implemented using other types of logical devices without departing from the invention.

A system in accordance with one or more embodiments of the invention may include any number of clients (e.g., 130.2, 130.4) without departing from the invention. For example, a system may include a single clients (e.g., 130.2) or multiple clients (e.g., 130.2, 130.4).

In one or more embodiments of the invention, the clients generate scheduled backups, such as full raw disk backups, full non-raw disk backups, incremental raw disk backups and/or incremental non-raw backups according to a schedule and a priority list received from the backup management system (110). The clients (130) may transfer the generated scheduled backups to the backup storages (120). For additional details regarding clients (130), refer to FIG. 2.1.

In one or more embodiments of the invention, the backup storages (120) are implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup storages (120) described through this application and all, or a portion, of the methods illustrated in FIGS. 3.1-4. The backup storages (120) may be implemented using other types of computing devices without departing from the invention. For additional details regarding computing devices, refer to FIG. 6.

In one or more embodiments of the invention, the backup storages (120) are implemented using distributed computing devices. As used herein, a distributed computing device refers to functionality provided by a logical device that utilizes the computing resources of one or more separate and/or distinct computing devices. For example, in one or more embodiments of the invention, the backup storages (120) are implemented using distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the clients (130). The data storage services may include storing of data provided by the clients (130) and providing of previously stored data to the clients (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the data stored in the backup storages (120) includes full raw disk backups and incremental raw disk backups generated by clients (130). The backup storages (120) may generate synthetic raw disk backups using full raw disk backups and one or more incremental raw disk backups. Each synthetic raw disk backup may be associated with a later state of a respective client then the state of the client when the full raw disk backup was generated.

The backup storages (120) may also generate degenerative incremental raw disk backups using full raw disk backups and the one or more incremental raw disk backups. Each degenerative raw disk backup is usable to revert a respective synthetic raw disk backup to a previous state, e.g., to a full raw disk backup.

While described above as storing backups of clients (130), the backup storages (120) may store other types of data from the clients (130), or other entities, without departing from the invention.

In one or more embodiments of the invention, the backup management system (110) is implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup management system (110) described through this application and all, or a portion, of the methods illustrated in FIGS. 3.1-4. The backup management system (110) may be implemented using other types of computing devices without departing from the invention. For additional details regarding computing devices, refer to FIG. 6.

In one or more embodiments of the invention, the backup management system (110) is implemented using distributed computing devices. As used herein, a distributed computing device refers to functionality provided by a logical device that utilizes the computing resources of one or more separate and/or distinct computing devices. For example, in one or more embodiments of the invention, the backup management system (110) is implemented using distributed devices that include components distributed across any number of separate and/or distinct computing devices. In such a scenario, the functionality of the backup management system (110) may be performed by multiple, different computing devices without departing from the invention.

In one or more embodiments of the invention, the backup management system (110) provides backup management and restoration services.

Backup management may include (i) generating scheduled backups, such as full raw disk backups, full non-raw disk backups, incremental raw disk backups and/or incremental non-raw backups according to a schedule and a priority list and (ii) generating synthetic raw disk backups and degenerative incremental raw disk backups using the generated full raw disk backups and incremental raw disk backups.

Restoration services may include (i) obtaining requests to restore clients (130), (ii) generating disk volumes using full raw disk backups, synthetic raw disk backups, and/or one or more degenerative raw disk backups based on the restoration requests, (iii) providing instances of the clients (130) with access to the generated disk volumes, and (iv) restoring clients (130) using full non-raw disk backups and/or one or more incremental non-raw disk backups based on the restoration requests.

To provide backup and/or restoration services, the backup management system (110) may orchestrate the operation of any number of entities (e.g., instruct backup storages (120) to send copies of backups, instruct clients (130) to instantiate applications, etc.). The backup management system (110) may orchestrate the operation of these entities using any command and control scheme including, for example, message passing, state sharing, publish-subscribe communications, etc.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, clients may host applications, such as virtual machines, database applications, electronic communication applications, file sharing applications, and/or other types of applications. FIG. 2.1 shows a diagram of an example client (200) in accordance with one or more embodiments of the invention. The example client (200) may be similar to any of the clients (130, FIG. 1). As discussed above, the example client (200) may provide: (i) application services and (ii) backup services.

To provide the aforementioned functionality of the example client (200), the example client (200) may include applications (210), an operating system (220), a client backup manager (230), and storage (240). Each component of the example client (200) is discussed below.

The applications (210) may be implemented using computing instructions executed using physical computing resources of the example client (200) and/or other entities. In other words, each of the applications (210) may be implemented as computer instructions stored on a persistent storage that when executed by a processor of the example client (200) and/or other entities give rise to the functionality of the respective application of the applications (210). The applications may be database applications, a word processor, electronic communication applications, file sharing applications, and/or other types of applications. The example client (200) may host any number of applications (e.g., 210.2, 210.4) without departing from the invention.

One or more of the applications (210) may be applications that are accessible by other entities. For example, an application may be a virtual machine that hosts database applications, a word processor, electronic communication applications, file sharing applications, and/or other types of applications. Each of the virtual machines may host any number of applications without departing from the invention.

Each of the applications (210) may perform similar or different functions. For example, a first application may be a database application and a second application may be an electronic communications application. In another example, a first application may be a first instance of a database application and a second application may be a second instance of the database application.

In one or more embodiments of the invention, all, or a portion, of the applications provide services to a user of the example client (200). The provided services may correspond to the type of application of each of the applications. When providing application services to the user, data that is relevant to the user may be received by and/or generated by the applications. The applications may store such relevant data as part of application data associated with respective applications in client storage (240) of the example client (200) and/or other entities.

In some embodiments of the invention, portions, or all, of the application data may be stored remotely from the example client (200). For example, the application data may be stored in a second client, a backup storage, or another entity, that does not host the applications. In some cases, the application data may be spanned across multiple entities or multiple copies of the application data may be stored in multiple virtual machines to facilitate cooperative action by multiple instances of an application that are hosted by multiple virtual machines. The application data may be stored in other locations without departing from the invention.

In one or more embodiments of the invention, the client operating system (220) implemented using a computer program that may execute on the underlying hardware of the client (200). Specifically, the client operating system (220) may oversee client (200) operations. To that extent, the client operating system (220) may include functionality to, for example, support fundamental client (200) functions; schedule tasks; mediate interactivity between logical (e.g., software) and physical (e.g., hardware) client (200) components (e.g., by providing any number of layers of abstraction of the hardware such as, for example, via virtualization, containers, etc.); allocate client (200) resources; and execute or invoke other computer programs executing on the client (200). One of ordinary skill will appreciate that the client operating system (220) may perform other functionalities without departing from the invention. For example, the client operating system (220) may facilitate application (210.2, 210.4) interaction with data stored locally on the storage (240).

The client backup manager (230) may provide backup services for the example client (200). The backup services may include (i) obtaining information from the backup management system including whether raw disk backups or non-raw disk backups should be generated, (ii) obtaining information from the backup management system including when scheduled backups should be generated and (ii) storing the generated backups in backup storages (120, FIG. 1) for future use.

When providing its functionality, the client backup manager (230) may utilize the storage (240) by storing data structures including information used by the client backup manager (230) in the storage (240).

In one or more embodiments of the invention, the storage (240) is implemented using devices that provide data storage services (e.g., storing data and providing copies of previously stored data). The devices that provide data storage services may include hardware devices and/or logical devices. For example, storage (240) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (240) may include a memory device (e.g., a dual in line memory device) in which data is stored and from which copies of previously stored data are provided. In another example, storage (240) may include a persistent storage device (e.g., a solid state disk drive) in which data is stored and from which copies of previously stored data is provided. In a still further example, storage (240) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

To provide the above noted functionality of the client backup manager (230), the client backup manager (230) may perform all, or a portion, of the methods illustrated in FIGS. 3.1-4.

In one or more embodiments of the invention, the client backup manager (230) is implemented using a hardware device including circuitry. The client backup manager (230) may be implemented using, for example, a digital signal processor, a field programmable gate array, or an application specific integrated circuit. The client backup manager (230) may be implemented using other types of hardware devices without departing from the invention.

In one or more embodiments of the invention, the client backup manager (230) is implemented using computing code stored on a persistent storage that when executed by a processor performs all, or a portion, of the functionality of the client backup manager (230). The processor may be a hardware processor including circuitry such as, for example, a central processing unit or a microcontroller. The processor may be other types of hardware devices for processing digital information without departing from the invention.

While the example client (200) of FIG. 2.1 has been described and illustrated as including a limited number of components for the sake of brevity, a client in accordance with embodiments of the invention may include additional, fewer, and/or different components than those illustrated in FIG. 2.1 without departing from the invention.

As discussed above, the backup management system (110) may provide, in part, data protection services to the clients (130). FIG. 2.2 shows a diagram of an example backup management system (250) in accordance with one or more embodiments of the invention. The example backup management system (250) may be similar to the backup management system (110, FIG. 1).

To provide the aforementioned functionality of the example backup management system (250), the example backup management system (250) may include backup manager (252) and storage (254). Each component of the example backup management system (250) is discussed below.

The backup manager (252) may provide backup services and restoration services. The backup services may include (i) generating scheduled backups of the clients (130, FIG. 1), such as full raw disk backups, full non-raw disk backups, incremental raw disk backups and/or incremental non-raw backups according to a schedule and a priority list and (ii) generating synthetic raw disk backups and degenerative incremental raw disk backups using the generated full raw disk backups and incremental raw disk backups.

The restoration services may include (i) obtaining requests to restore clients (130, FIG. 1), (ii) generating disk volumes using full raw disk backups, synthetic raw disk backups, degenerative raw disk backups, full non-raw disk backups, and/or incremental non-raw disk backups based on the restoration requests, and (iii) providing instances of the clients (130, FIG. 1) with access to the generated disk volumes.

To provide backup and/or restoration services, the backup manager (252) may orchestrate the operation of any number of entities illustrated in FIG. 1 (e.g., instruct backup storages to send copies of backups, instruct a client to instantiate applications, etc.). The backup manager (252) may orchestrate the operation of these entities using any command and control scheme including, for example, message passing, state sharing, publish-subscribe communications, etc.

When providing its functionality, the backup manager (252) may utilize the storage (254) by storing data structures including information used by the backup manager (252).

To provide the above noted functionality of the backup manager (252), the backup manager (252) may perform all, or a portion, of the methods illustrated in FIGS. 3.1-4.

In one or more embodiments of the invention, the backup manager (252) is implemented using a hardware device including circuitry. The backup manager (252) may be implemented using, for example, a digital signal processor, a field programmable gate array, or an application specific integrated circuit. The backup manager (252) may be implemented using other types of hardware devices without departing from the invention.

In one or more embodiments of the invention, the backup manager (252) is implemented using computing code stored on a persistent storage that when executed by a processor performs all, or a portion, of the functionality of the backup manager (252). The processor may be a hardware processor including circuitry such as, for example, a central processing unit or a microcontroller. The processor may be other types of hardware devices for processing digital information without departing from the invention.

In one or more embodiments of the invention, the storage (254) is implemented using devices that provide data storage services (e.g., storing data and providing copies of previously stored data). The devices that provide data storage services may include hardware devices and/or logical devices. For example, storage (254) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (254) may include a memory device (e.g., a dual in line memory device) in which data is stored and from which copies of previously stored data are provided. In another example, storage (254) may include a persistent storage device (e.g., a solid state disk drive) in which data is stored and from which copies of previously stored data is provided. In a still further example, storage (254) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (254) may store data structures including a priority list (256) for the clients and a backup schedule (258) for the clients. Each of these data structures is discussed below.

The priority list (256) may be implemented using one or more data structures. The data structures may include information regarding the priority of clients (130, FIG. 1). Based on the priority list, the clients will generate either raw disk backups or generate non-raw disk backups.

For example, consider a scenario in which a first client (e.g., 130.2, FIG. 1) is a high priority client and a second client (e.g., 130.4, FIG. 1) is a lower priority client. In this scenario, the backup manager (252) will orchestrate, by the first client, generation of raw disk backups and generation, by the second client, non-raw disk backups to manage the computing load placed on the backup storage. As will be discussed in greater detail below, when raw disk backups are stored in backup storage, the backup storage may perform a process of generating a synthetic backup which imposes a computing resource load on the backup storage. To manage such computing resource loads, the backup manager (252) may selectively instruct different clients to either store raw disk or non-raw disk backups in the backup storage. The selectivity level may depend, for example, on the quantity of computing resources available to the backup storage, service level agreements (or other policies) that may dictate a level of responsiveness in terms of performance of restorations, and/or other considerations.

The backup schedule (258) may be implemented using one or more data structures. The data structures may include information regarding when backups for clients must be generated to meet the requirements of service level agreements (or other policies). To meet these requirements, the backup schedule (258) may specify when clients will generate full backups and/or incremental backups.

For example, the backup schedule may be implemented by a client backup manager, an administrator, or an actor in the system of FIG. 1 to generate a full backup every six hours and generate an incremental backup every two hours between full backups.

The type of full backup and/or incremental backup that is generated according to the backup schedule (258) may vary based on the priority of the clients (130, FIG. 1). For example, a high priority client may generate full raw disk backups and incremental raw disk backups while a lower priority client may generate full non-raw disk backups and incremental non-raw disk backups.

While the example backup management system (250) of FIG. 2.2 has been described and illustrated as including a limited number of components for the sake of brevity, a backup management system in accordance with embodiments of the invention may include additional, fewer, and/or different components than those illustrated in FIG. 2.2 without departing from the invention.

As discussed above, the backup storages (120) may store backups generated by the clients (130, FIG. 1). FIG. 2.3 shows a diagram of an example backup storage (270) in accordance with one or more embodiments of the invention. The example backup storage (270) may be similar to the backup storage (120, FIG. 1).

To provide the aforementioned functionality of the example backup storage (270), the example backup storage (270) may include a storage manager (272) memory (274), and storage (280). Each component of the example backup storage (270) is discussed below.

The storage manager (272) may provide backup and/or restoration services for the clients (130, FIG. 1). The backup services may include (i) obtaining full backups and/or incremental backups from the clients, (ii) generating synthetic backups using full raw disk backups and incremental raw disk backups obtained from the clients, and/or (iii) generating degenerative incremental raw disk backups using the full raw disk backups and the incremental raw disk backups obtained from the clients.

The restoration services may include (i) generating a disk volume generated using one or more backups of the clients, for example a full raw disk backup, a synthetic backup (e.g., a full non-raw disk backup or a full non-raw disk backup combined with one or more incremental non-raw disk backups), and/or a non-raw disk backup upon receiving a restoration request and/or (ii) providing a new instance of a client with access to the disk volume.

When providing its functionality, the storage manager (272) may utilize the memory (274) and the storage (280) by storing data structures including information used by the storage manager (272).

To provide the above noted functionality of the storage manager (272), the storage manager (272) may perform all, or a portion, of the methods illustrated in FIGS. 3.1-4.

In one or more embodiments of the invention, the storage manager (272) is implemented using a hardware device including circuitry. The storage manager (272) may be implemented using, for example, a digital signal processor, a field programmable gate array, or an application specific integrated circuit. The storage manager (272) may be implemented using other types of hardware devices without departing from the invention.

In one or more embodiments of the invention, the storage manager (272) is implemented using computing code stored on a persistent storage that when executed by a processor performs all, or a portion, of the functionality of the storage manager (272). The processor may be a hardware processor including circuitry such as, for example, a central processing unit or a microcontroller. The processor may be other types of hardware devices for processing digital information without departing from the invention.

In one or more embodiments of the invention, the memory (274) is implemented using devices that provide data storage services (e.g., storing data and providing copies of previously stored data). The devices that provide data storage services may include hardware devices and/or logical devices. For example, memory (274) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, memory (274) may include a memory device (e.g., a dual in line memory device) in which data is stored and from which copies of previously stored data are provided. In another example, memory (274) may include a persistent storage device (e.g., a solid state disk drive) in which data is stored and from which copies of previously stored data is provided. In a still further example, memory (274) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The memory (274) may store data structures including incremental raw disk backups (276). Incremental raw disk backup (276) may be implemented using one or more data structures. The data structures may include incremental raw backup generated by clients that specifies changes made to data of the client that occurred after a full raw disk backup was generated.

In one or more embodiments of the invention, the storage (280) is implemented using devices that provide data storage services (e.g., storing data and providing copies of previously stored data). The devices that provide data storage services may include hardware devices and/or logical devices. For example, storage (280) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (280) may include a memory device (e.g., a dual in line memory device) in which data is stored and from which copies of previously stored data are provided. In another example, storage (280) may include a persistent storage device (e.g., a solid state disk drive) in which data is stored and from which copies of previously stored data is provided. In a still further example, storage (280) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (280) may store data structures including backups (282). The backups (282) may be implemented using one or more data structures including a first backup chain (284), a second backup chain (288), and a third backup chain (294). Each of these data structures is discussed below.

The first backup chain (284) may be implemented using one or more data structures. In one or more embodiments of the invention, the data structures may include a full raw disk backup (286) generated by a client. The full raw disk backup (286) may be stored in raw disk format, i.e., the disk is stored in a format that can be directly used by the backup storage (270) to create a disk volume without additional processing steps (e.g., combining blocks of the full raw disk backup into a single disk file).

The second backup chain (288) may be implemented using one or more data structures. In one or more embodiments of the invention, the data structures may include a synthetic raw disk backup (290) and a degenerative incremental backup (292).

In one or more embodiments of the invention, the synthetic raw disk backup (290) may be generated using a full raw disk backup (286) or a previously generated synthetic raw disk backup previously stored on the second backup chain (288) and an incremental raw disk backup (e.g., 276) generated by a client and stored on the memory (274). Once stored on the memory (274), the incremental raw disk backup, along with the full raw disk backup or the previously generated synthetic raw disk backup is used to create the synthetic raw disk backup (290), which replaces a previously generated full raw disk backup in the second backup chain (288). Similar to the full raw disk backup (286), the synthetic raw disk backup (290) may be used to create a disk volume without additional, processing steps. However, the synthetic raw disk backup is associated with a later state of the client than the state associated with the full raw disk backup (286).

The incremental raw disk backup (e.g., 276) and the full raw disk backup (286) or the previously generated synthetic raw disk backup may also be used to generate the degenerative incremental backup (292). The degenerative incremental backup (292) may be usable to revert the synthetic raw disk backup (292) to a previous state, e.g., to a full raw disk backup or a previous synthetic raw disk backup.

The third backup chain (294) may be implemented using one or more data structures. In one or more embodiments of the invention, the data structures may include an incremental non-raw disk backup (296) and a full non-raw disk backup (298) generated by a client. Unlike the full or synthetic raw disk backup described above, the full non-raw disk backup may require additional processing before it can be used to restore a client (e.g., 130.2, FIG. 1). For example, the blocks of the full non-raw disk backup may need to be combined into a single disk file and/or the disk file may need to be converted into a different format prior to use.

In one or more embodiments of the invention, the incremental non-raw disk backup (296) is usable to bring the full non-raw disk backup (298) to a later state, i.e., a state after the full non-raw disk backup (298) was generated. The incremental non-raw disk backup (298) may specify changes made to data of the client that occurred after a full non-raw disk backup (298) was generated. However, unlike the incremental raw disk backup (276) and a full raw disk backup (286), the incremental non-raw disk backup (296) may not be used to modify the full non-raw disk backup (298) until a restoration request is received. Once a restoration request for the state of the client associated with the incremental non-raw disk backup (296) is received, the incremental non-raw disk backup (296) may be combined with the full non-raw disk backup (298) to restore the client to the state associated with the incremental non-raw disk backup (296).

While the data structures stored in storage (280) have been described as including a limited amount of specific information, any of the data structures stored in storage (280) may include additional, less, and/or different information without departing from the invention. Further, the aforementioned data structures may be combined, subdivided into any number of data structures, may be stored in other locations (e.g., in a storage hosted by another device), and/or spanned across any number devices without departing from the invention.

Returning to FIG. 1, the system may provide backup services to clients. FIGS. 3.1-4 illustrate methods that may be performed by the system of FIG. 1 when providing backup services.

FIG. 3.1 shows a flowchart of a method in accordance with one or more embodiments of the invention. The method depicted in FIG. 3.1 may be used to provide backup services in accordance with one or more embodiments of the invention. The method shown in FIG. 3.1 may be performed by, for example, the backup management system backup (110, FIG. 1) or managers (e.g., 230, FIG. 2.1). Other components of the system illustrated in FIG. 1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, a request to generate a backup for a client is obtained.

In one or more embodiments of the invention, the backup management system (110, FIG. 1) may request that a client (e.g., 130.2, FIG. 1) generate a backup at a point in time according to a backup schedule (258, FIG. 2.2) either directly or through an intermediary, such as another manager (e.g., 230, FIG. 2.1).

In step 302, it is determined whether the client is a high restoration priority client.

In one or more embodiments of the invention, the determination is made by the client backup manager (230, FIG. 2.1) based on a priority list (e.g., 256, FIG. 2.2) provided by the backup management system (250, FIG. 2.2) that indicates if a specific client is a high priority client. In other embodiments, the determination may be initiated by another manager (e.g., 252, FIG. 2.2) by instructing or otherwise causing the client backup manager (230, FIG. 2.1) to make the determination.

If it is determined that the client is a high restoration priority client, the method may proceed to step 304 via the YES path shown in FIG. 3.1. If it is determined that the client is not a high restoration priority client, the method pay proceed to step 308 via the NO path shown in FIG. 3.1.

In step 304, a raw disk backup for the client is obtained using the method illustrated in FIG. 3.2, which is discussed in more detail below.

In step 306, the raw disk backup is stored in backup storage in raw disk format using the method illustrated in FIG. 3.3, which is discussed in more detail below.

The method may end following step 306.

Returning to step 302, the method may proceed to step 308 following step 302 if the client is not a high restoration priority client.

In step 308, a non-raw disk backup for the client is obtained.

In one or more embodiments of the invention, a non-raw disk backup (e.g., a full non-raw disk backup or an incremental non-raw disk backup) is generated by the client backup manager (230, FIG. 2.1) according to a schedule (e.g., 258, FIG. 2.2). In other embodiments, the non-raw disk backup may be generated by another manager (e.g., 252, FIG. 2.2) by instructing or otherwise causing the client backup manager (230, FIG. 2.1) to generate the non-raw disk backup.

In contrast to a raw disk backup, the non-raw disk backup may reflect changes to or the bit sequences corresponding to logical files rather than blocks. Consequently, non-raw disk backups may require more computing resources to obtain and may require more computing resources to utilize for restoration purposes (e.g., because raw disk backups may only require writing of the blocks whereas non-raw disk backups may require utilizing any number of layers of abstraction/indirection to ascertain which data and which blocks need to be modified based on file-level information included in a non-raw disk backup).

In step 310, the non-raw disk backup is stored in backup storage.

In one or more embodiments of the invention, the non-raw disk backup may be transferred to the backup storages (120, FIG. 1) by sending a copy of it (and/or other data structures derived) to the backup storages (120, FIG. 1). In one or more embodiments of the invention, the transfer of the non-raw disk backup is initiated by the client host backup manager (230, FIG. 2.1). In other embodiments, the transfer may be initiated by another manager (e.g., 252, FIG. 2.2).

The method may end following step 310.

Turning now to FIG. 3.2, FIG. 3.2 shows a flowchart of a method in accordance with one or more embodiments of the invention. The method depicted in FIG. 3.2 may be used to obtain a raw disk backup in accordance with one or more embodiments of the invention. The method shown in FIG. 3.2 may be performed by, for example, the backup management system backup (110, FIG. 1) or managers (e.g., 230, FIG. 2.1). Other components of the system illustrated in FIG. 1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 320, it is determined whether a full raw disk backup for the client is stored in backup storage.

In one or more embodiments of the invention, the determination is made by the client backup manager (230, FIG. 2.1) based on a backup schedule (e.g. 258, FIG. 2.2) provided by the backup management system (250, FIG. 2.2) that indicates when full backups and incremental backups are generated. In other embodiments, the determination may be initiated by another manager (e.g., 252, FIG. 2.2) by instructing or otherwise causing the client backup manager (230, FIG. 2.1) to make the determination.

In one or more embodiments of the invention, the determination is made by the client backup manager (230, FIG. 2.1) based on the data structures stored in the backup storages (120, FIG. 1). For example, if a full raw disk backup of the client was previously stored in the backup storages (120, FIG. 2), the client backup manager (230, FIG. 2.1) determines that an incremental raw disk backup is to be generated. In other embodiments, the determination may be initiated by another manager (e.g., 252, FIG. 2.2) by instructing or otherwise causing the client backup manager (230, FIG. 2.1) to make the determination.

If it is determined that a full raw disk backup for the client is stored in backup storage, the method may proceed to step 322 via the YES path shown in FIG. 3.2. If it is determined that a full raw disk backup for the client is not stored in backup storage, the method may proceed to step 324 via the NO path shown in FIG. 3.2.

In step 322, an incremental raw disk backup for the client is obtained.

In one or more embodiments of the invention, the incremental raw disk backup is generated by the client backup manager (230, FIG. 2.1) according to a schedule (e.g., 258, FIG. 2.2) provided by the backup manager (252, FIG. 2.2). The backup manager (252, FIG. 2.2) may also provide instructions for generating the incremental raw disk backup. Specifically, the backup manager (252, FIG. 2.2) may instruct the client backup manager (230, FIG. 2.1) to look at system metadata regarding block modifications, read the modified blocks, and include all of the data in the modified blocks in the incremental raw disk backup.

In other embodiments, the incremental raw disk backup may be generated by another manager (e.g., 272, FIG. 2.3) by instructing or otherwise causing the client backup manager (230, FIG. 2.1) to generate the incremental raw disk backup. The incremental raw disk backup may be in raw disk format and include a listing of each block of a disk of the client in which data stored in the respective block was changed during a predetermined period of time, i.e., the period of time since generation of the full raw disk backup.

The method may end after step 322.

Returning to step 320, the method may proceed to step 324 following step 320 if a full raw disk backup for the client is not stored in backup storage.

In step 324, a full raw disk backup is obtained for the client.

In one or more embodiments of the invention, the full raw disk backup is generated by the client backup manager (230, FIG. 2.1) according to a schedule (e.g., 258, FIG. 2.2). In other embodiments, the full raw disk backup may be generated by another manager (e.g., 252, FIG. 2.2) by instructing or otherwise causing the client backup manager (230, FIG. 2.1) to generate the full raw disk backup. The full raw disk backup may be in raw disk format and include a listing of each block of a disk of the client in which data is stored and the data stored in each block of the listing.

The method may end after step 324.

Turning now to FIG. 3.3, FIG. 3.3 shows a flowchart of a method in accordance with one or more embodiments of the invention. The method depicted in FIG. 3.2 may be used to store a raw disk backup in accordance with one or more embodiments of the invention. The method shown in FIG. 3.3 may be performed by, for example, the backup management system backup (110, FIG. 1) or managers (e.g., 230, FIG. 2.1). Other components of the system illustrated in FIG. 1 may perform all, or a portion, of the method of FIG. 3.3 without departing from the invention.

While FIG. 3.3 is illustrated as a series of steps, any of the steps may be omitted, performed in a different order, additional steps may be included, and/or any or all of the steps may be performed in a parallel and/or partially overlapping manner without departing from the invention.

In step 340, it is determined whether the raw disk backup is a full raw disk backup.

The determination may be made, for example, based on an identifier or other metadata associated with the raw disk backup. The identifier or other metadata may specify whether the raw disk backup is a full raw disk backup or an incremental raw disk backup. In some embodiments, the determination may be made based on an analysis of the information included in the raw disk backup. For example, the raw disk backup may specify whether portions of its data corresponding to a disk reflect either (i) changes made to a block (e.g., indicating that the raw disk backup in not a full raw disk backup) or (ii) the data of a block at a particular point in time (e.g., indicating that the raw disk backup is a full raw disk backup).

In one or more embodiments of the invention, the determination is made by the backup manager (252, FIG. 2.2) based on a backup schedule (e.g., 258, FIG. 2.2) that indicates when full backups and incremental backups are generated. In other embodiments, the determination may be initiated by another manager (e.g., 230, FIG. 2.1) by instructing or otherwise causing the backup manager (252, FIG. 2.2) to make the determination.

In one or more embodiments of the invention, the determination is made by the backup manager (252, FIG. 2.2) based on the data structures stored in the backup storages (120, FIG. 1). For example, if a full raw disk backup of the client was previously stored in the backup storages (120, FIG. 2), the backup manager (252, FIG. 2.2) determines that the raw disk backup for the client is an incremental raw disk backup. In other embodiments, the determination may be initiated by another manager (e.g., 230, FIG. 2.1) by instructing or otherwise causing the client backup manager (252, FIG. 2.2) to make the determination.

If it is determined that the raw disk backup is a full raw disk backup, the method may proceed to step 342 via the NO path shown in FIG. 3.3. If it is determined that the raw disk backup is not a full raw disk backup, the method pay proceed to step 348 via the YES path shown in FIG. 3.3.

In step 342, a synthetic raw disk backup is generated using the raw disk backup and an existing full raw disk backup associated with the client.

In one or more embodiments of the invention, the existing full raw disk backup of the client is generated by the client backup manager (230, FIG. 2.1) and transferred to the backup storages (120, FIG. 1) based on instructions received from the backup manager (252, FIG. 2) by sending a copy of it (and/or other data structures derived from the backup) to the backup storages (120, FIG. 1) via one or more networks (or other communications medium), as described above with reference to FIG. 3.1. In other embodiments, the full raw disk backup may be generated and/or the transfer may be initiated by another manager (e.g., 252, FIG. 2.2) by instructing or otherwise causing the application host backup manager (230, FIG. 2.1) to generate and/or transfer the full raw disk backup.

In one or more embodiments of the invention, synthetic backup is generated by the storage manager (272, FIG. 2.3) based on instructions received from the backup manager (252, FIG. 2.2) by applying changes to blocks of the existing full raw disk backup specified by the incremental raw disk backup. By applying the changes to the existing full raw disk backup, the synthetic raw disk backup may reflect a state of the client (for which the backups were generated) at a later point in time. In other embodiments, the synthetic raw disk backup may be generated by another manager (e.g., 252, FIG. 2.2) by instructing or otherwise causing the storage manager (272, FIG. 2.3) to generate the synthetic raw disk backup. The synthetic raw disk backup may be usable to create a disk volume associated with the state of the client at the time the incremental raw disk backup was created.

For example, the existing full raw disk backup may reflect the state of the client at a first point in time and the raw disk backup may reflect changes made to the state of the client over a period of time beginning at the first point in time and ending at a second point in time (i.e., a later point in time). By applying the changes specified by the raw disk backup to the existing full raw disk backup, the resulting synthetic raw disk backup may reflect the state of the client (e.g., the data of the client) at the second point in time. Consequently, the synthetic backup may be usable to perform a restoration of the client to its state at the second point in time.

In step 344, a degenerative incremental raw disk backup for the synthetic raw disk backup is obtained.

In one or more embodiments of the invention, the degenerative incremental raw disk backup is obtained by identifying block level differences between the synthetic raw disk backup and the full raw disk backup. The storage manager (272, FIG. 2.3) may generate the degenerative incremental raw disk backup based on instructions received from the backup manager (252, FIG. 2.2) by aggregating the identified block level differences as a series of instructions for modifying the synthetic full raw disk backup to obtain the full raw disk backup. Metadata may also be added to the degenerative raw disk backup indicating, for example, the point in time to which the full raw disk backup may be usable to restore the client. In other embodiments, the degenerative incremental raw disk backup may be generated by another manager (e.g., 252, FIG. 2.2) by instructing or otherwise causing the storage manager (272, FIG. 2.3) to generate the degenerative incremental raw disk backup. The degenerative incremental raw disk backup may be usable to revert the synthetic raw disk backup into the full raw disk backup (which may be usable to restore the client to a state associated with a point in time associated with the full raw disk backup rather than a second point in time associated with the synthetic raw disk backup).

In step 346, the synthetic raw disk backup and the degenerative incremental raw disk backup are stored in storage as part of an existing backup chain for the client.

In one or more embodiments of the invention, the synthetic raw disk backup and the degenerative incremental raw disk backup are stored by the storage manager (272, FIG. 2.3) as part of an existing backup chain for the client stored on the backup storages (120, FIG. 1) based on instructions received from the backup manager (252, FIG. 2). In one or more embodiments of the invention, the storage of the synthetic raw disk backup and the degenerative incremental raw disk backup is initiated by the client host backup manager (230, FIG. 2.1). In other embodiments, the storage may be initiated by another manager (e.g., 252, FIG. 2.2).

The method may end after step 346.

Returning to step 340, the method may proceed to step 348 following step 340 if the raw disk backup is a full raw disk backup.

In step 348, the full raw disk backup are stored in backup storage as part of a new backup chain for the client.

In one or more embodiments of the invention, the full raw disk backup may be transferred to the backup storages (120, FIG. 1) by sending a copy of it (and/or other data structures) to the backup storages (120, FIG. 1) to be stored as part of a new backup chain for the client via one or more networks (or other communications medium) based on instructions received from the backup manager (252, FIG. 2). In one or more embodiments of the invention, the transfer of the full raw disk backup is initiated by the client host backup manager (230, FIG. 2.1). In other embodiments, the transfer may be initiated by another manager (e.g., 252, FIG. 2.2).

Figure 4:
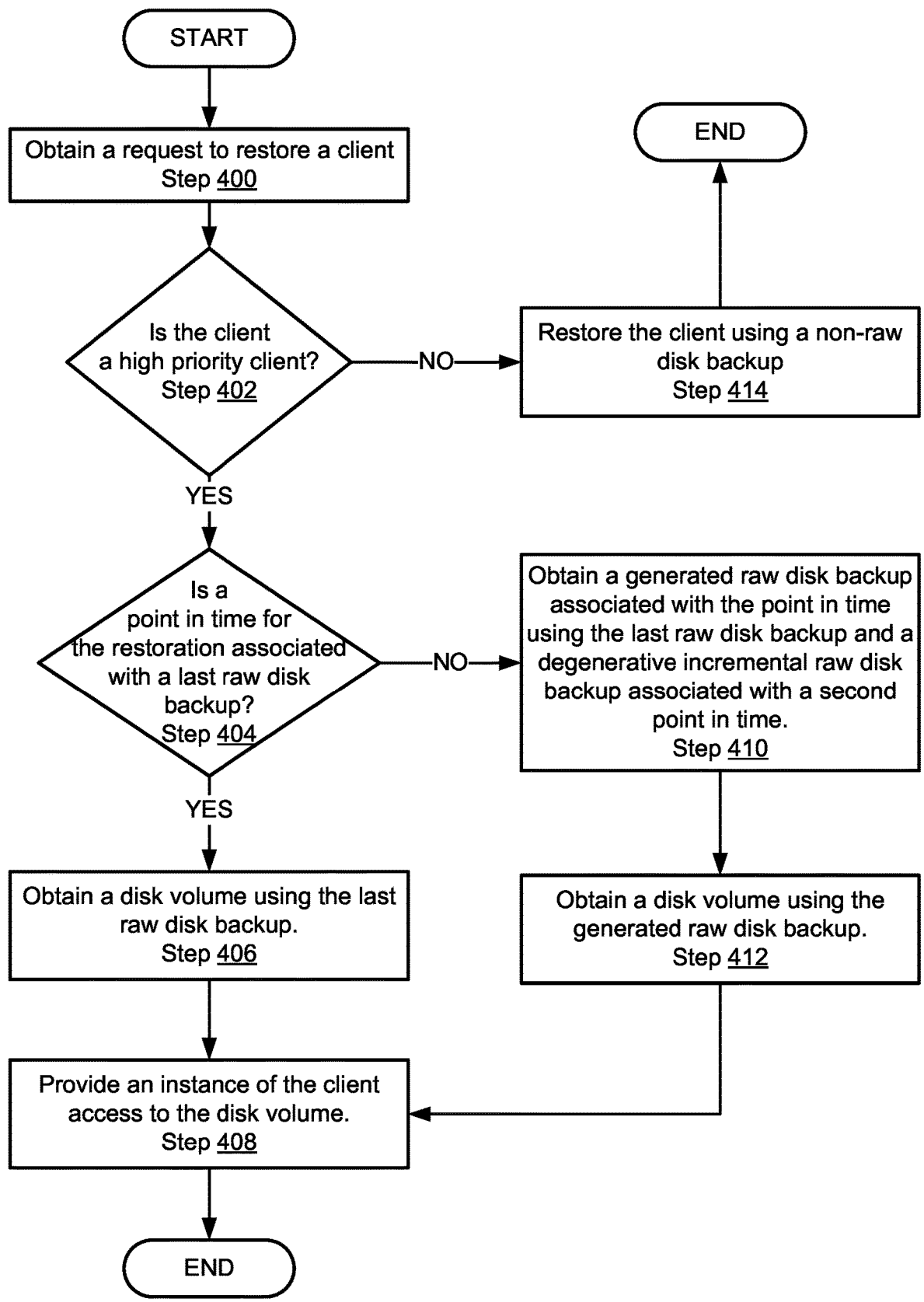
FIG. 4 shows a flowchart of a method of performing a restoration in accordance with one or more embodiments of the invention.

FIG. 4 shows a flowchart of a method in accordance with one or more embodiments of the invention. The method depicted in FIG. 4 may be used to provide restoration services in accordance with one or more embodiments of the invention. The method shown in FIG. 4 may be performed by, for example, the backup management system backup (110, FIG. 1) or managers (e.g., 230, FIG. 2.1). Other components of the system illustrated in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a request to restore a client is obtained.

In one or more embodiments of the invention, an administrator or a user generates the request to restore a client using a computing device and transmits the restoration request via one or more networks (or other communications medium) to the backup manager (252, FIG. 2.2), either directly or through an intermediary, such as another manger (e.g., 230, FIG. 2.1).

In step 402, it is determined whether the client is a high restoration priority client.

In one or more embodiments of the invention, the determination is made by the client backup manager (230, FIG. 2.1) based on a priority list (e.g., 256, FIG. 2.2) provided by the backup management system (250, FIG. 2.2) that indicates if a specific client is a high priority client. In other embodiments, the determination may be initiated by another manager (e.g., 252, FIG. 2.2) by instructing or otherwise causing the client backup manager (230, FIG. 2.1) to make the determination.

If it is determined that the client is a high restoration priority client, the method may proceed to step 404 via the YES path shown in FIG. 4. If it is determined that the client is not a high restoration priority client, the method pay proceed to step 414 via the NO path shown in FIG. 4.

In step 404, it is determined whether a point in time for the restoration is associated with a last raw disk backup. The point in time (e.g., to which previous point in time to which the client is to be restored) may be specified by the restoration request.

In one or more embodiments of the invention, the determination of whether the point in time for the restoration is associated with the last raw disk backup (e.g., the latest full raw disk backup or the latest synthetic raw disk backup) is made by the backup manager (252, FIG. 2.2) by comparing the requested restoration point in time with the backup schedule (258, FIG. 2.2) or metadata regarding backups stored in backup storage that may specify points to which the various backups in the backup storage may be used to restore the client. For example, the backup manager (252, FIG. 2.2) may determine that requested restoration point in time matches the point in time associated with the latest scheduled raw disk backup and, therefore, the requested restoration point in time is associated with the last raw disk backup. In other embodiments, the determination may be initiated by another manager (e.g., 230, FIG. 2.1) by instructing or otherwise causing the backup manager (252, FIG. 2.2) to make the determination.

If it is determined that the point in time for the restoration is associated with a last raw disk backup, the method may proceed to step 406 via the YES path shown in FIG. 4. If it is determined that the point in time for the restoration is not associated with the last raw disk backup, the method pay proceed to step 410 via the NO path shown in FIG. 4.

In step 406, a disk volume is obtained using the last raw disk backup (e.g., a full raw disk backup or a synthetic full raw disk backup).

In one or more embodiments of the invention, the last raw disk backup of the client (e.g., a full raw disk backup or a synthetic raw disk backup) is generated by the client backup manager (230, FIG. 2.1) and/or the backup storages (120, FIG. 1) as described above with reference to FIGS. 3.1-3.3. In other embodiments, the last raw disk backup may be generated by another manager (e.g., 252, FIG. 2.2) by instructing or otherwise causing the application host backup manager (230, FIG. 2.1) to generate the last raw disk backup.

In one or more embodiments of the invention, the storage manager (272, FIG. 2.3) generates a disk volume using the last raw backup of the client. In other embodiments, the generation of the disk volume may be initiated by another manager (e.g., 244, FIG. 2.2) by instructing or otherwise causing the storage manager (272, FIG. 3) to generate the disk volume.

In one or more embodiments of the invention, the disk volume is generated by instantiating a disk volume corresponding to, at least, a number of blocks specified by the last raw disk backup (the disk volume may include more blocks than specified by the last raw disk backup). The disk volume may be instantiated by invoking the functionality of another entity such as an operating system or other management system of the backup storage that manages the hardware resources of the backup storage.

After instantiating the disk volume, the block level data specified by the last raw disk backup may be written to blocks in the disk volume. The blocks may correspond to those upon which the last raw disk backup is based or may be different. If different, a mapping table that maps the blocks upon which the last raw disk backup is based to those in which the corresponding data is stored in the disk volume may be generated. The mapping table may prevent or reduce the impact of differences in the organization of the data in the disk volume from that which the client expects on the operation of a restored client that utilizes the disk volume.

In step 408, an instance of the client is provided access to the disk volume.

In one or more embodiments of the invention, the storage manager (272, FIG. 3) provides an instance of the client (e.g., 130.2, FIG. 1) with access to the disk volume generated using the raw disk backup via one or more networks (or other communications medium). In other embodiments, access to the disk volume may be provided by another manager (e.g., 252, FIG. 2.2) by instructing or otherwise causing the storage manager (272, FIG. 3) to provide access to the disk volume.

The method may end following step 408.

Returning to step 404, the method may proceed to step 410 following step 404 if the point in time for the restoration is not associated with the last raw disk backup.

In step 410, a synthetic raw disk backup associated with the point in time is obtained using the last raw disk backup associated with a second point in time and a degenerated incremental raw disk backup.

In one or more embodiments of the invention, the backup manager (252, FIG. 2.2) determines a degenerative incremental raw disk backup associated with the restoration request by comparing the requested restoration point in time with the backup schedule (258, FIG. 2.2). For example, the backup manager (252, FIG. 2.2) may determine that requested restoration point in time matches a second point in time associated with a degenerative incremental raw disk backup. In other embodiments, the determination may be initiated by another manager (e.g., 230, FIG. 2.1) by instructing or otherwise causing the backup manager (252, FIG. 2.2) to make the determination.

Based on the determination, the storage manager (272, FIG. 2.3) may create a generated raw disk backup (e.g., a full raw disk backup or a synthetic raw disk backup) using the last raw disk backup and the degenerative incremental raw disk backup associated with the second point in time, as well as any degenerative incremental raw disk backups created between the last raw disk backup and the second point in time. In other embodiments, the generation of the generated raw disk backup may be initiated by another manager (252, FIG. 2.2) by instructing or otherwise causing the backup manager (272, FIG. 2.3) to generate the generated raw disk backup.

In one or more embodiments of the invention, the generated raw disk backup is obtained by applying block level changes specified by the degenerative incremental raw disk backup to the last raw disk backup.

In step 412, a disk volume is obtained using the generated raw disk backup.

In one or more embodiments of the invention, the storage manager (272, FIG. 3) provides an instance of the client with access to the disk volume generated using the generated raw disk backup via one or more networks (or other communications medium). In other embodiments, access to the disk volume may be provided by another manager (e.g., 252, FIG. 2.2) by instructing or otherwise causing the storage manager (272, FIG. 3) to provide access to the disk volume.

In one or more embodiments of the invention, the disk volume is generated by instantiating a disk volume corresponding to, at least, a number of blocks specified by the last raw disk backup (the disk volume may include more blocks than specified by the last raw disk backup). The disk volume may be instantiated by invoking the functionality of another entity such as an operating system or other management system of the backup storage that manages the hardware resources of the backup storage.

After instantiating the disk volume, the block level data specified by the last raw disk backup may be written to blocks in the disk volume. The blocks may correspond to those upon which the last raw disk backup is based or may be different. If different, a mapping table that maps the blocks upon which the last raw disk backup is based to those in which the corresponding data is stored in the disk volume may be generated. The mapping table may prevent or reduce the impact of differences in the organization of the data in the disk volume from that which the client expects on the operation of a restored client that utilizes the disk volume.

Following step 412, the method may proceed to step 408 described above.

Returning to step 402, the method may proceed to step 414 following step 402 if the client is not a high priority client.

In step 414, the client is restored using a non-raw disk backup.

In one or more embodiments of the invention, a non-raw disk backup (e.g., a full non-raw disk backup or an incremental non-raw disk backup) is generated by the client backup manager (230, FIG. 2.1) according to a schedule (e.g., 258, FIG. 2.2), as described above with reference to FIG. 3.1. In other embodiments, the non-raw disk backup may be generated by another manager (e.g., 252, FIG. 2.2) by instructing or otherwise causing the client backup manager (230, FIG. 2.1) to generate the non-raw disk backup.

Upon obtaining the request to restore a client, the backup manager (252, FIG. 2) may send a copy of the non-raw disk backup to the client (e.g., 130.2, FIG. 1). The client may use the non-raw disk backup to generate a disk volume by invoking the functionality of another entity such as an operating system or other management system of the backup storage that manages the hardware resources of the backup storage and provide applications with access to the data stored on the disk volume. In other embodiments, the restoration may be initiated by another manager (e.g., 230, FIG. 2.1) by instructing or otherwise causing the backup manager (252, FIG. 2.2) to restore the client.

The method may end following step 414.

Thus, via the method illustrated in FIGS. 3.1-4, one or more embodiments of the invention may facilitate backup and restoration using raw disk backups. The raw disk backups allow for creation of a disk volume without the additional processing associated with restoring a client via a non-raw disk backup. Therefore, the time involved accessing data stored on a backup is decreased. Accordingly, the experience of users of the system of FIG. 1 may be improved.

Figure 5:
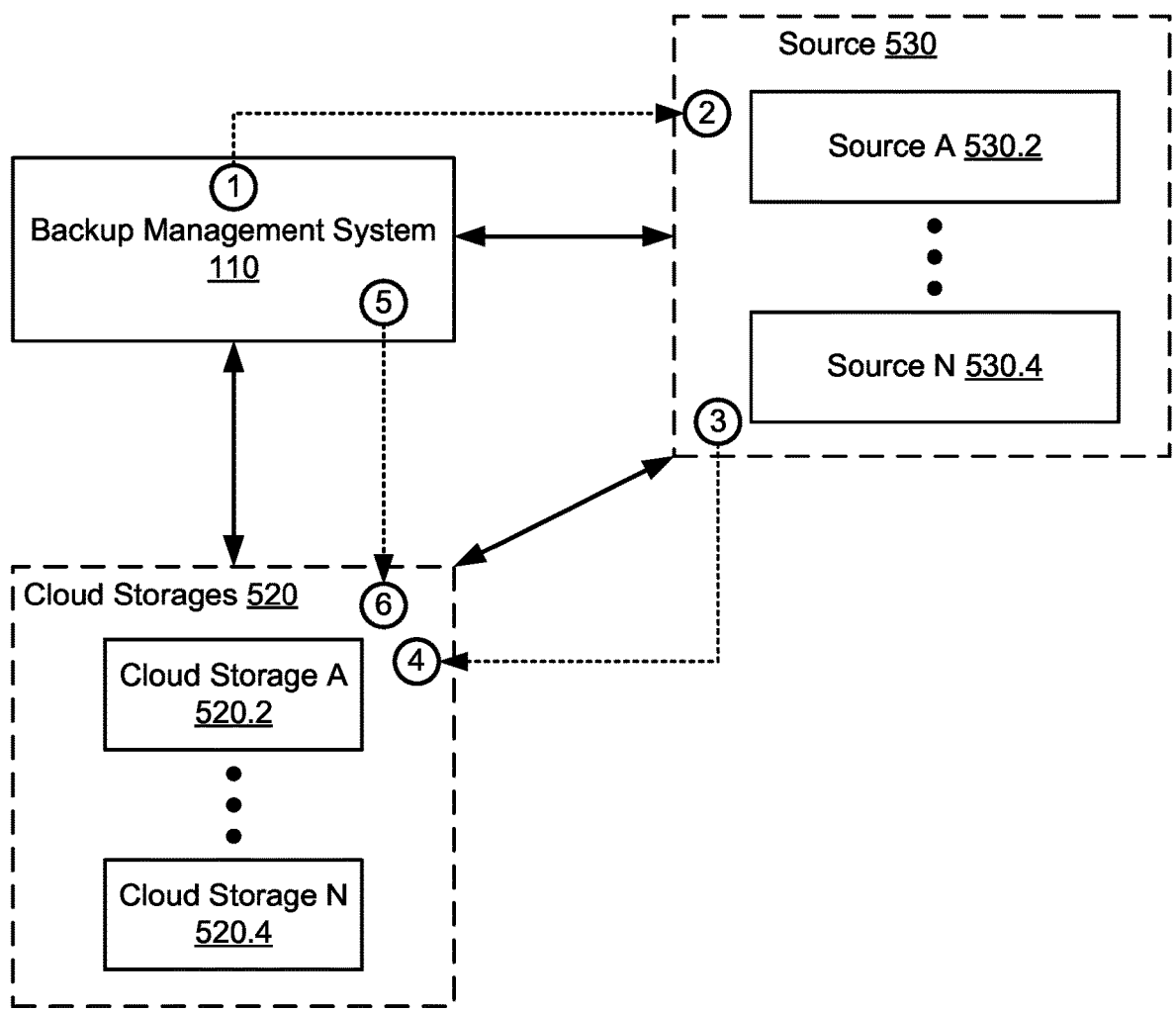
FIG. 5 shows a diagram of a non-limiting example of a system in accordance with embodiments of the invention.

To further clarify embodiments of the invention, a non-limiting example is provided in FIG. 5. FIG. 5 shows a diagram of an example system similar to that of FIG. 1.

EXAMPLE

Consider a scenario as illustrated in FIG. 5 in which a backup management system (110), at step 1, provides information to the sources (530) that enables the sources (530) to independently generate scheduled backups. The information may include which of the sources (530) are high priority clients. The information may include a backup schedule of when the sources (530) are to generate a full backup and/or an incremental backup.

The backup management system (110) also provides information to the cloud storages (520) that enables the cloud storages (520) to create synthetic raw disk backups and degenerative incremental raw disk backups upon receipt of an incremental raw disk backup.

In step 2, each of the sources (530) generate full raw disk backups, incremental raw disk backups, full non-raw disk backups, and/or incremental non-raw disk backups based on the backup schedule and the priority list.

In step 3, the sources (530) then transfer copies of the generated backups to the cloud storages (520).

In step 4, the cloud storages (520) store the full raw disk backups and full non-raw disk backups as parts of new backup chains for the clients that generated the respective backups. The cloud storages (520) also create synthetic raw disk backups and degenerative incremental raw disk backups using incremental raw disk backups and store the synthetic raw disk backups and degenerative incremental raw disk backups in existing backup chains associated with the clients that generated the respective incremental raw disk backups. Further, the cloud storages (520) store the incremental non-raw disk backups in existing backup chains associated with the clients that generated the respective incremental non-raw disk backups.

In step 5, the backup management system (110) obtains a request to restore a client to a point in time. The backup management system (110) determines the raw disk backup (e.g., a full raw disk backup, a synthetic raw disk backup, or a degenerative raw disk backup) that is associated with the point in time. The backup management system then transmits information to the cloud storages (520) that enables the backup storages to generate a disk volume using the identified raw disk backup(s).

In step 6, the cloud storages (520) receive the information from the backup management system (110) and generate the disk volume using the identified raw disk backup(s). The backup storages (120) then provide a source (e.g., 530.4) access to the generated disk volume.

END OF EXAMPLE

Any of the components of FIG. 1 may be implemented using distributed computing devices. As used herein, a distributed computing device refers to functionality provided by a logical device that utilizes the computing resources of one or more separate and/or distinct computing devices.

Figure 6:
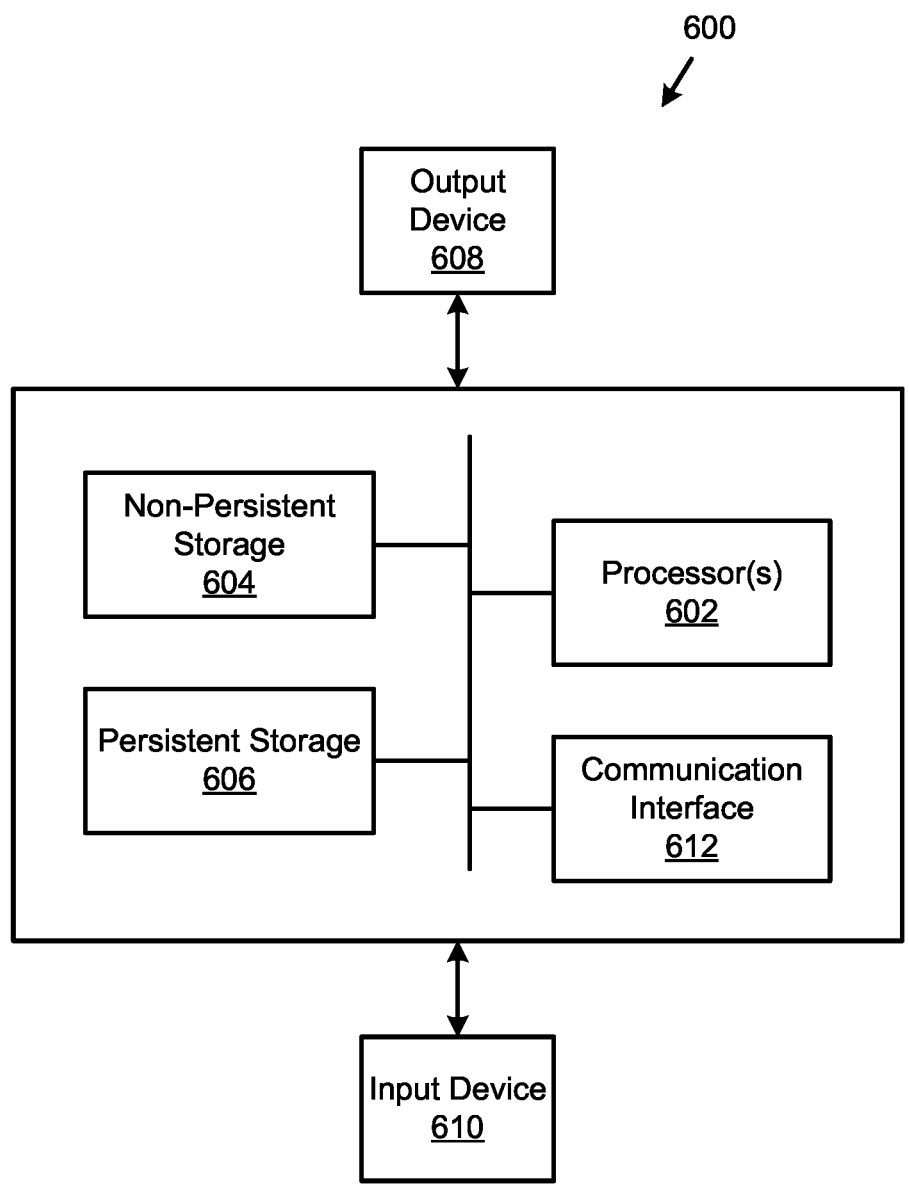
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one or more embodiments of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one or more embodiments of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the invention as disclosed herein. Accordingly, the scope of the invention should be limited only by the attached claims.

What is claimed is:

1. A backup manager for providing backup services to clients, comprising:
   a storage for storing a priority list; and
   a processor programmed to:
   obtain a request to generate a backup for a client of the clients;
   make a determination that the client is a high restoration priority client using the priority list;
   in response to the determination:
   obtain a raw disk backup for the client; and
   store the raw disk backup in backup storage in raw disk format.

2. The backup manager of claim 1, wherein generating the raw disk backup for the client comprises:
   making a second determination that a full raw disk backup for the client is stored in the backup storage; and
   in response to the second determination:
   obtaining an incremental raw disk backup for the client.

3. The backup manager of claim 2, wherein the incremental raw disk backup specifies only changes made to data of the client that occurred after a last backup that was generated for the client.

4. The backup manager of claim 1, wherein:
when the raw disk backup is a full raw disk backup, the raw disk backup comprises:
a first listing of each block of a disk of the client in which data is stored, and
data stored in each block of the first listing,
when the raw disk backup is an incremental raw disk backup, the raw disk backup comprises:
a second listing of each block of a disk of the client in which data stored in the respective block was changed during a predetermined period of time, and
data stored in each block of the second listing.

5. The backup manager of claim 1, wherein storing the raw disk backup in the backup storage in the raw disk format comprises:
making a second determination that the raw disk backup is a full raw disk backup; and
in response to the second determination:
storing the full raw disk backup as part of a new backup chain for the client.

6. The backup manager of claim 1, wherein storing the raw disk backup in the backup storage in the raw disk format comprises:
making a second determination that the raw disk backup is an incremental raw disk backup;
in response to the second determination:
obtaining a synthetic raw disk backup using the raw disk backup and an existing full raw disk backup associated with the client;
obtaining a degenerative incremental raw disk backup for the synthetic raw disk backup; and
storing the synthetic raw disk backup and the degenerative incremental raw disk backup in storage as part of an existing backup chain for the client.

7. The backup manager of claim 6, wherein the degenerative incremental raw disk backup is usable to revert the synthetic raw disk backup into the full raw disk backup.

8. The backup manager of claim 1, wherein the processor is further programmed to:
after storing the raw disk backup:
obtain a restoration request for a second client;
make a second determination that the client is a high restoration priority client using the priority list;
in response to the second determination
make a third determination that a point in time for the restoration request is associated with a full raw disk backup;
in response to the third determination:
obtain a disk volume using the full raw disk backup; and
provide an instance of the client remote access to the disk volume.

9. The backup manager of claim 1, wherein the processor is further programmed to:
after storing the raw disk backup:
obtain a restoration request for a second client;
make a second determination that the client is a high restoration priority client using the priority list;
in response to the second determination
make a third determination that a point in time for the restoration request is not associated with a full raw disk backup;
in response to the third determination:
obtain a synthetic raw disk backup associated with the point in time using a full raw disk backup associated with a second point in time and a degenerated incremental raw disk backup;
a disk volume using the synthetic raw disk backup; and
provide an instance of the client remote access to the disk volume.

10. The backup manager of claim 9, wherein the point in time and the second point in time are different times.

11. A method of providing backup services to clients, the method comprising:
obtaining a request to generate a backup for a client of the clients;
making a determination that the client is a high restoration priority client using a priority list;
in response to the determination:
obtaining a raw disk backup for the client; and
storing the raw disk backup in backup storage in raw disk format.

12. The method of claim 11, wherein generating the raw disk backup for the client comprises:
making a second determination that a full raw disk backup for the client is stored in the backup storage; and
in response to the second determination:
obtaining an incremental raw disk backup for the client.

13. The method of claim 12, wherein the incremental raw disk backup specifies only changes made to data of the client that occurred after a last backup that was generated for the client.

14. The method of claim 11, further comprising
after storing the raw disk backup:
obtaining a restoration request for a second client;
making a second determination that the client is a high restoration priority client using the priority list;
in response to the second determination
making a third determination that a point in time for the restoration request is associated with a full raw disk backup;
in response to the third determination:
obtaining a disk volume using the full raw disk backup; and
providing an instance of the client remote access to the disk volume.

15. The method of claim 11, further comprising:
after storing the raw disk backup:
obtaining a restoration request for a second client;
making a second determination that the client is a high restoration priority client using the priority list;
in response to the second determination
making a third determination that a point in time for the restoration request is not associated with a full raw disk backup;
in response to the third determination:
obtaining a synthetic raw disk backup associated with the point in time using a full raw disk backup associated with a second point in time and a degenerated incremental raw disk backup;
obtaining a disk volume using the synthetic raw disk backup; and
providing an instance of the client remote access to the disk volume.

16. A non-transitory computer readable medium comprising computer readable program code, which when executed by a computer processor enables the computer processor to perform a method for providing backup services to clients, the method comprising:
- obtaining a request to generate a backup for a client of the clients;
- making a determination that the client is a high restoration priority client using a priority list;
- in response to the determination:
  - obtaining a raw disk backup for the client; and
  - storing the raw disk backup in backup storage in raw disk format.

17. The non-transitory computer readable medium of claim 16, wherein generating the raw disk backup for the client comprises:
- making a second determination that a full raw disk backup for the client is stored in the backup storage; and
- in response to the second determination:
  - obtaining an incremental raw disk backup for the client.

18. The non-transitory computer readable medium of claim 17, wherein the incremental raw disk backup specifies only changes made to data of the client that occurred after a last backup that was generated for the client.

19. The non-transitory computer readable medium of claim 16, wherein the method further comprises:
- after storing the raw disk backup:
  - obtaining a restoration request for a second client;
  - making a second determination that the client is a high restoration priority client using the priority list;
  - in response to the second determination
    - making a third determination that a point in time for the restoration request is associated with a full raw disk backup;
  - in response to the third determination:
    - obtaining a disk volume using the full raw disk backup; and
    - providing an instance of the client remote access to the disk volume.

20. The non-transitory computer readable medium of claim 16, wherein the method further comprises:
- after storing the raw disk backup:
  - obtaining a restoration request for a second client;
  - making a second determination that the client is a high restoration priority client using the priority list;
  - in response to the second determination
    - making a third determination that a point in time for the restoration request is not associated with a full raw disk backup;
  - in response to the third determination:
    - obtaining a synthetic raw disk backup associated with the point in time using a full raw disk backup associated with a second point in time and a degenerated incremental raw disk backup;
    - obtaining a disk volume using the synthetic raw disk backup; and
    - providing an instance of the client remote access to the disk volume.

* * * * *